United States Patent Office 3,338,396
Patented Aug. 29, 1967

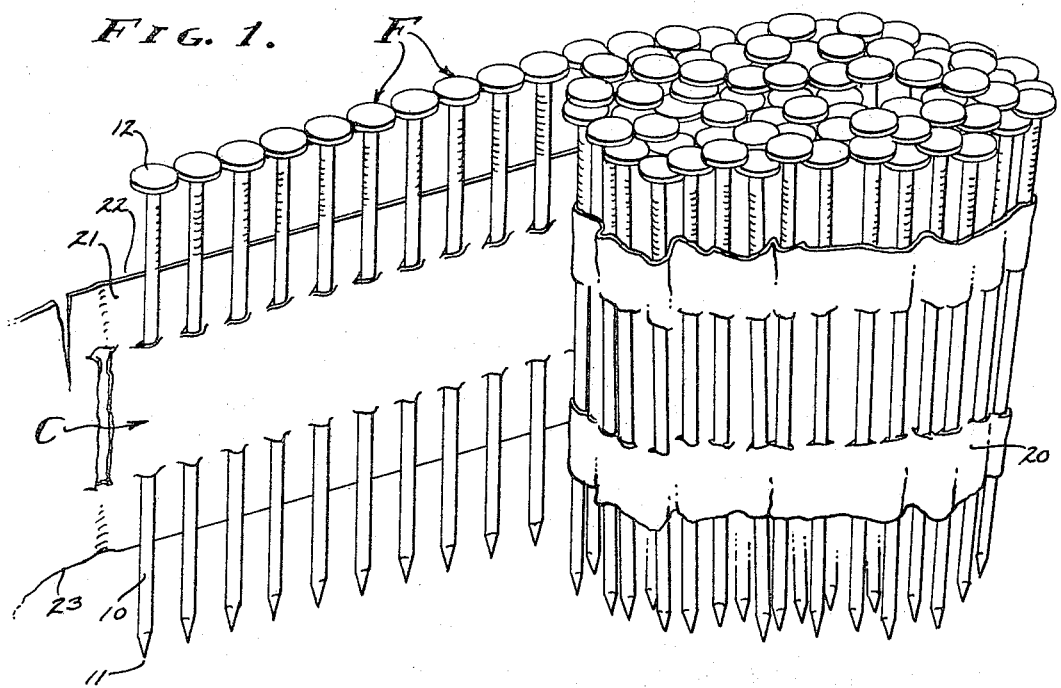
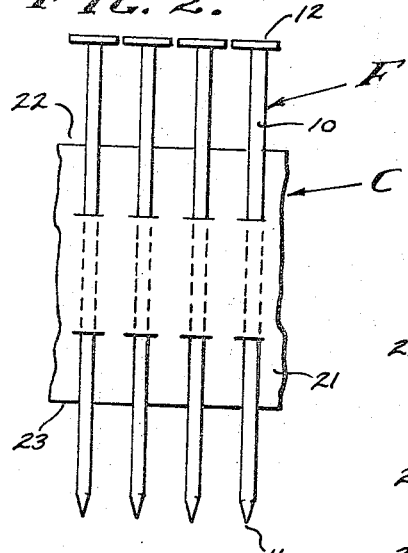
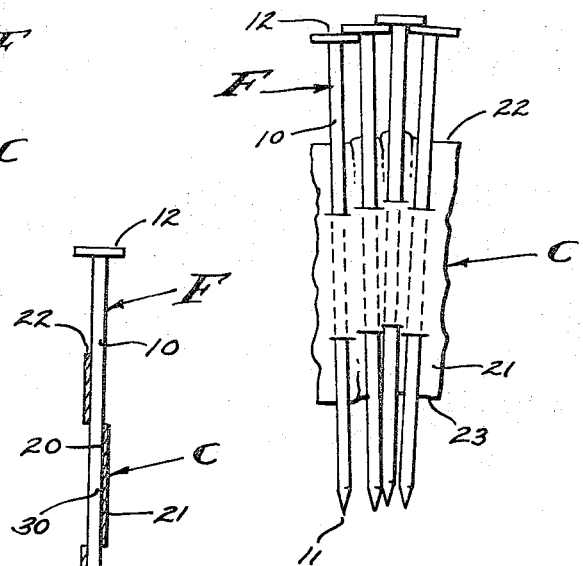
INVENTOR.
RICHARD E. POWERS

3,338,396
MAGAZINE SUPPLY FOR FASTENER DRIVING TOOLS
Richard E. Powers, San Marino, Calif., assignor to Powers Wire Products Co., Inc., El Monte, Calif., a corporation of California
Continuation of application Ser. No. 239,463, Nov. 23, 1962. This application Dec. 4, 1964, Ser. No. 416,091
4 Claims. (Cl. 206—56)

This is a continuation of application Ser. No. 239,463, filed Nov. 23, 1962, and now abandoned.

This invention is concerned with ordinary commercially available fasteners having an elongate shank and a round head, or any like fastener, and is particularly concerned with a package or supply of such fasteners adapted for use in mechanical drive tools, whereby a large bunch or supply can be carried by the tool and the fasteners consecutively engaged and driven thereby.

The fastener under consideration is one that has an enlarged head, the most ordinary fastener of this type being the ordinary nail. Therefore, I will disclose my invention as it relates to said ordinary nail, for example a "common nail," it being understood that other like and/or equivalent fasteners are to be related and combined in the same way. At the outset, there is nothing new in the fastener per se, it being a general object of this invention to let the fastener remain absolutely unaltered and at the same time provide a usable supply thereof for mechanical driving tools.

The prior art is redundant with modified fasteners of the type under consideration and although the various kinds of fasteners have usefulness, in many cases their use is prohibited by building codes which require certain fundamental features in a fastener. For example, nails with basically round heads are provided in "stick" formation with the shanks thereof arranged adjacently and adhered together, but with a portion of each head removed for nesting purposes and in order to permit the driven nail to pass from the stick. Also, there are T nails that have rectangular heads that lie side by side. There are others, and in each case the modifications are a detriment in one way or another, mainly because municipal bodies do not always approve of them or the cost of municipal acceptance is too great. In any case, the most practical and universally accepted fastener is the ordinary nail having a round shank pointed at on end and having an enlarged disc-shaped head in a normal plane at the other end. And any reduction or removal of metal from the head of a fastener is frowned upon since it reduces the holding power of the article.

It is an object of this invention to provide a supply of elongate fasteners, each of which has an enlarged head, and a supply thereof which can be compacted into a minimum of space.

Another object of this invention is to provide a supply of elongate fasteners of the character referred to and in the form of a frangible flexible belt or strip of material that can be easily compacted, bunched and gathered and folded and/or rolled together as circumstances may require and then restraightened when tension is reapplied to its ends.

It is still another object of this invention to provide a supply of fasteners of the character referred to, whereby said fasteners are arranged uniformly, all faced in the same direction, and adjacent to each other in substantially parallel relationship.

Also, it is an object of this invention to provide a carrier that is expendable as the fasteners are driven therefrom.

Finally, it is an object of this invention to provide a usable supply of fasteners, for example ordinary nails, compacted within a minimum space and whereby critical positioning within the supply is eliminated, prior to the driving action afforded by the drive tool utilized for delivering the fasteners into work.

The various objects and features of this invention will be fully understood from the following detailed description of the typical preferred form and application thereof, throughout which description reference is made to the accompanying drawings, in which:

FIG. 1 is a perspective view illustrating the arrangement of fasteners as they are supported by the carrier provided by the present invention.

FIG. 2 is a side elevation of a portion of the carrier when straightened and of the fasteners supported thereby.

FIG. 3 is a view showing the manner in which the carrier and fasteners are bunched, and the same as they appear bundled in FIG. 1.

FIG. 4 is a sectional view showing the manner in which the fasteners are inserted in and supported by the carrier.

The fastener F with which this invention is concerned is elongated and has an enlarged head at one end, as for instance an ordinary nail, or the like. This fastener F has a straight elongate cylindrical shank 10 that is of round cross-section and pointed at 11 at its lower terminal end. The head portion 12 is at the upper end of the nail, said head portion being considerably larger in diameter than the shank 10. There is no variation in this fastener when compared with an ordinary commercially available nail, the head being disc-shaped and disposed in a plane normal to the longitudinal axis of the fastener.

It is significant that the prior art has provided "sticks" of fasteners for use in magazines of driving tools, for example staple driving tools, tackers, nailers and the like. The said "sticks" are made up of a multiplicity of adjacently arranged fasteners, one fastener being arranged parallel to the next adjacent fastener. This usual arrangement of fasteners in a "stick" represents the general state of the art wherein the fasteners are rigidly related in parallelism. It is also significant that fasteners and the like have been belted and supported thereby in spaced parallel relationship, but this belting of fasteners is not feasible according to the prior art teachings since too much space is occupied by too few fasteners. That is, fasteners that are spaced and parallel and with their head diameters touching, have wasted space occurring between their shanks. Furthermore, the space economy factor is compounded when strips of such fasteners are folded or rolled spirally, by the radial spacing of adjacent convolutions of the strips as required by the head diameters.

In accordance with the present invention no attempt is made to preserve rigidity in the relationship of the fasteners as they occur in the supply. In carrying out this invention the fasteners F are permitted to move out of parallelism with each other, they are permitted to shift axially relative to each other, and their heads are permitted to overlap, whereby the supply of fasteners F can be compacted to a maximum degree. However, the fasteners F do remain interconnected so as to follow consecutively one after the other for sequential withdrawal from said supply thereof. Therefore, I provide a carrier C that is flexible and which can be tensioned in order to align the fasteners F as may be required.

The carrier C which characterizes the present invention is made up of any suitable pliant and supple material which is significantly stronger in tension than in compression and consequently that can be deflected, and a material that can be tensioned without an overamount of stretching. The carrier C is made of frangible flexible material that can be easily bunched together, or crumpled, and then restraightened by application of tension to the opposite ends thereof. It is also desirable to provide a material that is expendable or destructible, for example a frangible material which is easily destructed, either by fracturing, cutting or tearing. The carrier C is in the form of a belt having opposite sides 20 and 21 and oposite edges 22 and 23. The thickness and width of the belt can be varied widely depending upon the size of fastener to be supplied, and also depending upon the particular kind of material used in its construction. Also, the belt material can be doubled, as by folding at either or both margins thereof. For example, and as shown in the drawings, the carrier C is a flat strip or belt of kraft paper, an unbleached wood pulp paper of thirty ponud weight and to which the fasteners F are attached, said fasteners F being attached in spaced parallel relationship with their heads substantially touching but not necessarily in engagement with each other.

In practice, the fasteners can be attached to the flexible carrier in various manners. Preferably, the shank 10 of each fastener simply pierces the carrier C through one side 20 to have a portion lying adjacent the side 21 and again pierces through the side 21 to have a pair of spaced portions lying adjacent side 20. A permanent and predetermined relationship of the fastener to said carrier can be established either by frictional engagement due to the piercing by means of the fasteners per se, or by means of applying an adhesive as at 30.

From the foregoing it will be apparent that the flexible carrier C is a very practical part forming the expedient by which it is possible to bunch, gather, fold or roll a multiplicity of fasteners F together into a most compacted supply. In FIG. 1 of the drawings I have shown a roll of fasteners F supported by the carrier C that I provide and whereby a maximum number of fasteners is accommodated in a minimum of space. It is to be understood, however, that rolling is but one of the many formations which may be used in establishing a compacted supply of fasteners, since it is also feasible to fold or gather the supply at random so as to form a bunch of fasteners interconnected by the carrier. Notice, particularly, that the heads 12 of the individual fasteners overlie and underlie each other at random, in which case the flexible carrier C bends under compressive forces in order to permit longitudinal displacement of one fastener relative to the others. Furthermore, notice that the shanks 10 of the individual fasteners are not necessarily or always parallel with each other, in which case the flexible carrier C bends or folds between adjacent fasteners permitting them to converge one way or the other. The fasteners F are originally arranged and installed parallel with each other when the carrier C is held straight, and the fasteners F are secured to the carrier C by means of friction or by means of an adhesive, all as above described. The initially straight carrier C with the fasteners F supported thereby is then bunched, gathered, folded or rolled as shown in FIG. 1, whereupon discrepancies in relative positioning of the fasteners F occur.

One additional feature or improvement, and in addition to the said discrepancies which may occur at the first, is at the now bunched, gathered, folded or rolled supply of fasteners are further condensed by compacting or constructing them together by manual or other suitable means. The manipulation of the carrier C and fasteners F into said constructed condition can be accompanied by vibration or by a jostling action, whereby all or most all heads 12 overlap or underlap to some extent, and all to the end that the shanks 10 are brought as close together as it is possible, considering that all fasteners face or point in the same direction.

The utility of the instant fasteners and carrier combination lies in the feasibility of supplying ordinary nails, or the like, from a magazine of minimum size, and in the capacity of straightening the supply with its carrier after unbunching, ungathering, unfolding or unrolling of the compacted and constricted supply as hereinabove described. In actual practice, the drive tool for delivering the fasteners through the usual guideway and into a working position will have a suitable advancing and restraightening mechanism that consecutively transports the fasteners F supported by the carrier C and into aligned position within the said guideway of the said driving tool.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A magazine supply for power nailing tools comprising: a plurality of nails; a frangible carrier strip for loosely supporting said nails, said nails being positioned in a parallel, spaced relationship when said strip is tensioned in a direction perpendicular to the axes of said nails; said strip being made of flexible material and crumpled longitudinally for compact packing of said nails, and said nails reassuming said parallel, spaced relationship when tension is applied to said strip.

2. The magazine supply described in claim 1 wherein said carrier strip is made of flexible kraft paper, and said nails are supported by said strip by having the shank of said nails pierce said strip in at least two places.

3. The magazine supply described in claim 1 wherein said nails are supported by said strip by having the shank of said nails pierce said strip in at least two places.

4. A magazine supply for power nailing tools comprising a plurality of nails each having a head larger than the nail shank, an elongated frangible carrier strip for loosely supporting said nails whereby said nails may be broken free of said carrier strip by a power nailing tool, said nails being positioned in a parallel spaced relation with the head of each nail closely adjacent the head of the next nail and each head adjacent the same edge of said strip when said strip is tensioned along its longitudinal axis, said strip being made of material flexible in all directions perpendicular to the longitudinal axis of said strip and crumpled longitudinally for compact packing of said nails with said heads overlapping, said nails reassuming said parallel spaced relationship when tension along said longitudinal axis is again applied to said strip.

References Cited

UNITED STATES PATENTS

| 581,763 | 5/1897 | Neuss | 206—66 |
| 1,263,218 | 4/1918 | Fischer. | |
| 1,337,212 | 4/1920 | Elliott. | |
| 1,588,232 | 6/1926 | Jetter | 206—20 |
| 2,391,081 | 12/1945 | Von Hofe et al. | 206—79 |
| 2,982,595 | 5/1961 | Rogers. | |

FOREIGN PATENTS

| 21,223 | 8/1946 | Finland. |
| 1,850 | 1905 | Great Britain. |

THERON E. CONDON, *Primary Examiner.*

J. M. CASKIE, *Assistant Examiner.*